United States Patent [19]

Schustek

[11] 4,389,589
[45] Jun. 21, 1983

[54] DYNAMO ELECTRIC MACHINE-INTERNAL COMBUSTION ENGINE COMBINATION STRUCTURE

[75] Inventor: Siegfried E. Schustek, Immenstaad, Fed. Rep. of Germany

[73] Assignee: Robert Bosch GmbH, Stuttgart, Fed. Rep. of Germany

[21] Appl. No.: 289,194

[22] Filed: Aug. 3, 1981

[30] Foreign Application Priority Data

Oct. 7, 1980 [DE] Fed. Rep. of Germany ........ 3037793

[51] Int. Cl.³ .............................................. H02K 1/28
[52] U.S. Cl. ...................................... 310/258; 29/523; 29/598; 310/74; 310/156; 310/267; 411/501
[58] Field of Search ..................... 310/42, 51, 74, 184, 310/216, 218, 254, 256, 259, 156, 262, 267; 411/378, 537, 538, 500, 501, 502; 29/598, 523

[56] References Cited

U.S. PATENT DOCUMENTS

| | | | |
|---|---|---|---|
| 2,931,532 | 4/1960 | Gapp | 411/501 |
| 4,203,710 | 5/1980 | Farr | 417/53 |
| 4,300,275 | 11/1981 | McLaughlin | 29/157.3 C |
| 4,322,646 | 3/1982 | Persson | 310/64 |

FOREIGN PATENT DOCUMENTS

| | | | |
|---|---|---|---|
| 2811283 | 9/1979 | Fed. Rep. of Germany | 310/258 |
| 1193489 | 4/1959 | France | 411/537 |
| 374934 | 9/1939 | Italy | 411/500 |
| 407432 | 10/1944 | Italy | 411/538 |

*Primary Examiner*—J. D. Miller
*Assistant Examiner*—Don Rebsch
*Attorney, Agent, or Firm*—Frishauf, Holtz, Goodman & Woodward

[57] ABSTRACT

To attach a segmental stator, for example in the form of armature laminations, to the housing of a flywheel of an internal combustion engine, and permanent magnet rotor elements to the flywheel circumference, while permitting differential thermal expansion, the attachment elements include a shaft or web element (10, 210, 403, 403') which connects the respective magnetic structural component—stator laminations (1) or permanent magnet field (19)—to the engine structure housing (2) or flywheel (15), respectively, by two headed ends (8, 208, 408; 7, 207, 407) which may be in form of tapped cylindrical or spherical elements or cylindrical tubular portions fitted into holes (415) of the engine structure and expanded after placement, by driving a pin (FIG. 4c: 16) thereinto, or pulling a headed pin (FIG. 4d: 17) therethrough.

5 Claims, 7 Drawing Figures

DYNAMO ELECTRIC MACHINE-INTERNAL COMBUSTION ENGINE COMBINATION STRUCTURE

The present invention relates to a dynamo electric machine structure combined with an internal combustion engine, and more particularly to the attachment arrangement to attach stator and rotor components of the dynamo electric machine to the flywheel and flywheel housing, respectively, of the internal combustion engine.

BACKGROUND

It has previously been proposed to integrate an electric generator structure with the flywheel of an internal combustion engine, typically of the automotive type. This arrangement permits obtaining relatively high output from only segmentally placed stators, since the diameter of the flywheel is considerable; difficulties arise, however, in connection with attaching the electromagnetic structural components of the dynamo electric machine, for example a permanent magnet field and an armature stator package, to the respective housing and flywheel components of the internal combustion (IC) engine, due to the short axial length thereof and the brittleness of many of the electromagnetic structural components. Additionally, the working space to place attaching elements frequently is limited and, especially if repair or replacement of elements is needed, it is difficult to obtain access to the respective components.

High magnetic forces arise in operation. Integrating the generator structure with the flywheel also subjects the respective components to thermal expansion. The thermal expansion of the housing of the flywheel and of the stator elements may differ. It is thus necessary to provide a tight and secure connection between the stator elements, typically the armature electromagnetic structure and the flywheel housing. The rotor element, typically the field and usually a permanent magnet field, likewise places special requirements on the attachment arrangement. Permanent magnetic field elements are quite brittle. When placed at the outer circumference of the flywheel of an IC engine, they are subjected to high centrifugal forces. The structural space for attaching the elements, in axial direction, is limited. Successful placement of the magnetic structural components of a generator has led to difficulties.

THE INVENTION

It is an object to provide an attachment arrangement for the magnetic structural components of a dynamo electric machine, typically an alternating current generator, to the flywheel and flywheel housing of an internal combustion engine, in which reliable connection is insured, the magnetic components are held tightly against their respective counterparts of the IC engine, and placement of the components in an axially limited space can be readily effected.

Briefly, the connection is effected by units which have a shaft and two heads at either end which are so placed that the shaft is under tension. In accordance with a preferred embodiment, the shaft may be a threaded bolt, one head of which is standard and the other is constructed in form of a cylindrical element extending transversely to the bolt and having a diametrically threaded opening, the cylindrical element engaging an inclined or chamfered end portion of the magnetic structure, for example the end portion of a stator armature lamination package. Rather than using a cylindrical element, a ball socket can be used, or the head, likewise, may be formed with a rounded, part-spherical engagement surface meeting the counter surface of the IC engine component to permit self-alignment. Some of the components, for example a permanent magnet field structure, may be attached to the flywheel in such a way that the second head of the anti magnetic attachment element is recessed within the flywheel itself. To reliably place the shaft element of the bolt under tension, the second head may be formed with a through-bore which, after placement, is expanded by driving a tapered pin therein, or drawing a pin with an enlarged head therethrough to deform the head and place the shank portion under tension. For IC engines of small diameter, riveting may suffice, particularly if a resilient liner is interposed between the rivet heads and the components held together thereby to place the shank portion of the attachment element under tension after riveting has been effected by providing a tensioning force.

The arrangement has the advantage that the magnetic structural components of the generator tightly engage the fitting elements of the IC engine; the attachment elements do not extend axially or radially beyond the active portions of the machine, while permitting ready assembly. Different longitudinal thermal expansion of the magnetic structural components and of the IC engine components can be compensated, without loss of secure engagement of the magnetic components with the engine components.

In accordance with a preferred feature of the invention, the attachment elements are so arranged that the shaft portions extend radially with respect to the flywheel axis, so that tension forces always extend in radial direction. This also permits attachment of the elements on the substrate or support surface without play. Brittle permanent magnet elements can be attached and securely held by tension components without danger of fracture of the elements themselves.

DRAWINGS

Figure 1:
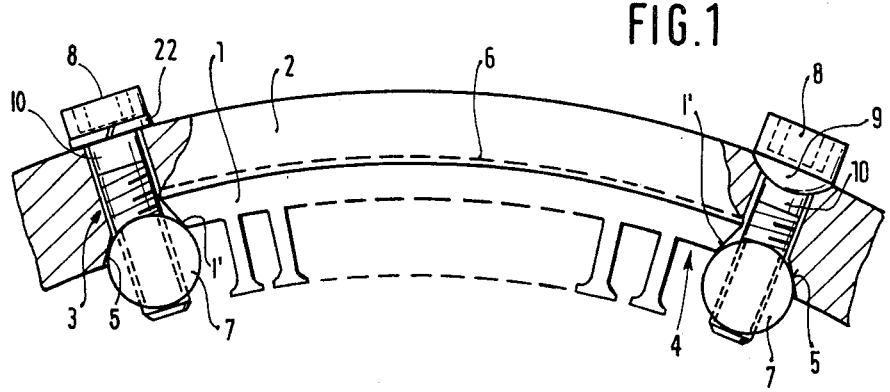
FIG. 1 is a fragmentary part-sectional axial view of the flywheel housing of an IC engine showing attachment of stator magnetic structural components thereto.

The inner wall of the housing 2 of the flywheel of an IC engine—not shown—has a stator segment 1 secured thereto. The stator segment carries at least part of the armature winding, for example three-phase windings of an automotive-type alternator. Due to the relatively large diameter of the flywheel, a segmental stator is sufficient for the required output power, and placing the stator in segmental form within the housing reduces costs and facilitates assembly.

In accordance with the invention, the stator segments 1, shown as a package of laminations, are secured to the housing 2 by attachment elements 3 which are fitted into bores of the housing 2. The elements 3 have a shaft or shank element 10 and two head portions 7, 8 which are so attached to the shaft 10 that they press the stator 1 against the housing 2. One of the heads 7 is formed as a cylindrical or spherical unit which fits against a chamfered or inclined surface 1' of the stator and against a matching inclined or spherical or cylindrical surface 5 on the housing. The end portions 4 of the stator segment 1 thus are securely seated against the housing. A resilient elastic intermediate layer 22, for example in form of a lock washer or the like, is preferably inserted between the head 8 and the outer surface of the housing 2. Preferably, the housing is formed with a recess 6 into which the laminations 1 are fitted.

The bores through which the attachment elements 3 pass preferably are somewhat wider than the diameter thereof, and the cylindrical or spherical heads 7 permit slight tilting or tipping of the bolts in case of differential expansion of the stator laminations 1 and the housing 2, to compensate for different thermal expansion. Preferably at least one of the bolts is formed with a spherical surface 9 fitting against a matching surface in the housing to facilitate such slight shifting with respect to a strictly radial direction. The attachment elements 3 have shanks 10 which are capable of accepting high tension forces so that, when the heads 8 are tightened against the heads 7, which are formed with tapped holes, the shanks 10 are placed under tension.

Figure 2:
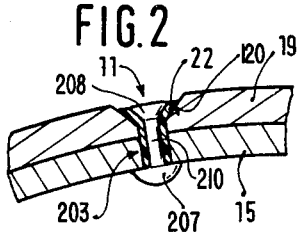
FIGS. 2 and 3 are fragmentary axial sections through the rim portion of an IC engine flywheel showing attachment of a permanent magnet field structure.

FIGS. 2, 3, 4a, and 4b illustrate attachment of a permanent magnet 19 to the rim portion 15 of the flywheel of an IC engine (not shown). The magnets 19 can be attached, in pairs, by suitably formed wedges or prisms 11 on the rim portion 15 of the flywheel. FIG. 2 illustrates a wedge-shaped head 208 of an attachment element 203, with a riveted-over head 207. The end portion 204 of the magnet 19 is countersunk to match the head 208. A resilient liner 22 is interposed between the head 208 and the head 207 so that, after riveting together—which effects compression of the liner 22—the liner 22 can then re-expand and place the shank portion 210 under tension. Rather than using riveting, a bolt-and-screw arrangement similar to that illustrated in FIG. 1 may be used, employing a countersunk head at the engagement surface with the magnet 19. Elements 203 can be axially elongated, fitted in matching slots.

Figure 3:
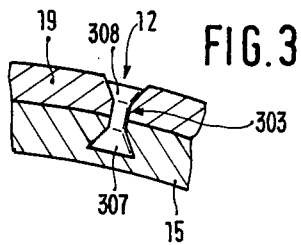

FIG. 3 illustrates an attachment element 12 which has a double-trapezoid shaped profile, including a wedge-shaped head 307 which is slid laterally into an elongated axially extending matching opening in the rim portion 50 of the flywheel 15. The shaft 303, originally straight, is then riveted over to form the head 308. Preferably, as in FIG. 2, a liner is also interposed. It has been omitted from FIG. 3 since it may not be strictly necessary, although desirable.

Figure 4A:
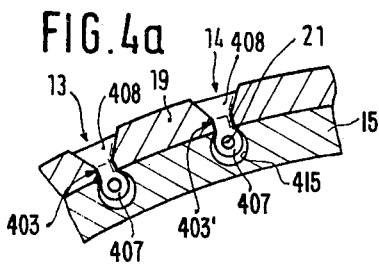
FIGS. 4a and 4b are fragmentary axial sectional views through the rim portion of the flywheel of an IC engine, showing attachment of permanent magnet (PM) field poles thereto.
Figure 4B:
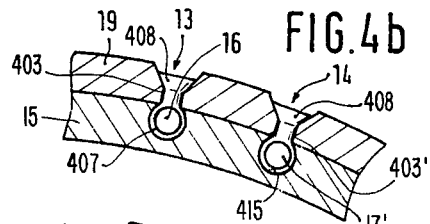

An attachment arrangement which places a shank portion of the attachment element reliably under tension is illustrated in FIGS. 4a, 4b, in which FIG. 4a illustrates the attachment arrangement before tensioning, and FIG. 4b the attachment arrangement after tensioning.

Figures 4C, 4D:
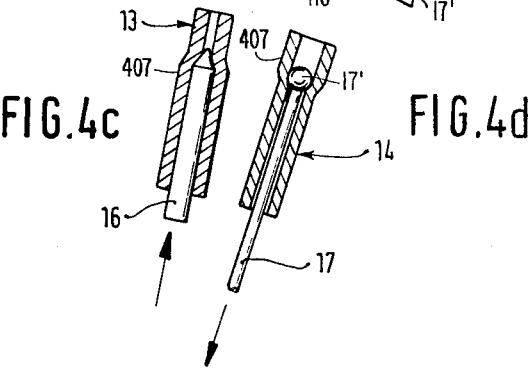
FIG. 4c is a part-sectional view of one expansion element for the tensioning head utilized in the structures of FIGS. 4a and 4b.
FIG. 4d is a view similar to FIG. 4c and illustrating another tensioning arrangement.

The rim of the flywheel 15 is formed with axially extending bores 415, into which pre-headed attachment elements 13, 14 are introduced. The pre-headed attachment elements 13, 14 have heads 406, shanks 403 and 403', and slightly expanded apertured lower heads 407. To then reliably and securely connect the magnet 19 to the flywheel 15, the elements 13, 14 are deformed to place the shank portion 403, 403' under tension. The heads 407 of the elements 13, 14 are formed with a through-bore 21. After initial loose interconnection of the elements, as shown in FIG. 4a, a bolt 16 is pressed into the hole 21 of the element 13—see FIG. 4c and FIG. 4b—to expand the initial hole 21, and press the outer wall portion of the head 407 within the opening 415 in the rim 15 of the flywheel. Element 14 has a mandrel 17 with an enlarged, typically ball-like end 17' pulled thereinto. By deformation of the head 407 of element 14, the shank 403' thereof is placed under tension and so expanded that the outer part of the hole 415 is filled. Any remaining part of the hole 415 which is not filled by the expanded head 407 of bolt 14 permits movement under differential thermal expansion, while still maintaining the shank 403' under tension. The deformation of the head 407, by the expansion upon material displacement of the head 407, insures uniform application of compressive force by the head 408 against the magnet 19, without sharp shocks, however, so that the brittle magnetic material of a permanent magnet 19 is not damaged during the attachment process, since it can be carried out without exerting any blows against the attachment elements themselves.

Various changes and modifications may be made, and features described in connection with any one of the embodiments may be used with any of the others, within the scope of the inventive concept. For example, the shank portion 210, 303, 403, 403' need not be cylindrical, but the entire attachment element can be made in form of an elongated strip, having the length, for example, of the tubular heads 407, with a web connecting to a wedge-shaped extended head 208, 308, 408, respectively.

Extending the wedge-shaped attachment element 11—FIG. 2—in axial direction throughout the axial length of the magnet 19, which would, at least approximately, also conform to the axial length of the flywheel rim 15, provides for reliable connection without danger of breakage in spite of application of a riveting connecting force since the element can be essentially preshaped, inserted axially, and only finally secured with the magnet 19 in place by minor application of force.

I claim:

1. Dynamo electric machine construction in combination with an internal combustion engine structure including a flywheel (15) and a housing (2) surrounding, at least in part, said flywheel said dynamo electric machine construction having a stator (1) secured to the housing (2);

segmental permanent magnet rotor element (19);

and attachment means for attaching the segmental permanent magnet elements of the rotor to the flywheel under tension, to securely attach said segmental elements to the flywheel, said attachment means comprising a shaft, or web element (403, 403') and two head elements (407, 408) formed on said shaft or web element;

one head element (408) bearing against the permanent magnet segments, and other head element (407) bearing against the flywheel, wherein the flywheel is formed with a plurality of axially extending cylindrical bores (415) adjacent the rim thereof and in the region of attachment of the permanent magnet segments;

the head elements (407) engaging the flywheel are formed with enlargements fitting into the axial bore of the flywheel, said enlarged head elements being formed with an axially extending bores (21) therein, the head elements being deformed by expansion from a smaller size, after insertion into the axially extending bores (415) of the flywheel to place the shaft or web element connecting the head elements under tension and thereby securely attach the permanent magnet segments against the flywheel, said enlarged, deformed head element essentially filling the axially extending bores in the flywheel.

2. Construction according to claim 1 further comprising an expansion pin (16) fitted into the bore in the head element (407), fitted in the axially extending bore of the flywheel.

3. Construction according to claim 1 including an expansion pin having a headed end (17') pulled at least in part through the bore of the head element (407) to expand the opening and deform the adjacent portion of the head element.

4. Construction according to claim 1, further including an underlay (22) of elastic material between at least one of the head elements and the adjacent structure.

5. Construction according to claim 1 wherein the permanent magnet rotor segments are formed with attachment holes therethrough;

and the attachment means comprises an axially elongated element having at least one wedge-shaped head fitted into an attachment hole.

* * * * *